July 18, 1950 A. P. BUFFINGTON 2,515,333

COIL SHIELDING MEANS

Filed April 2, 1946

INVENTOR.
ALAN P. BUFFINGTON
BY
William E. Denk.
AGENT

Patented July 18, 1950 2,515,333

UNITED STATES PATENT OFFICE 2,515,333

COIL SHIELDING MEANS

Alan P. Buffington, Philadelphia, Pa., assignor, by mesne assignments, to Philco Corporation, Philadelphia, Pa., a corporation of Pennsylvania Application April 2, 1946, Serial No. 658,928

4 Claims. (Cl. 250—27)

Figures 1, 2:
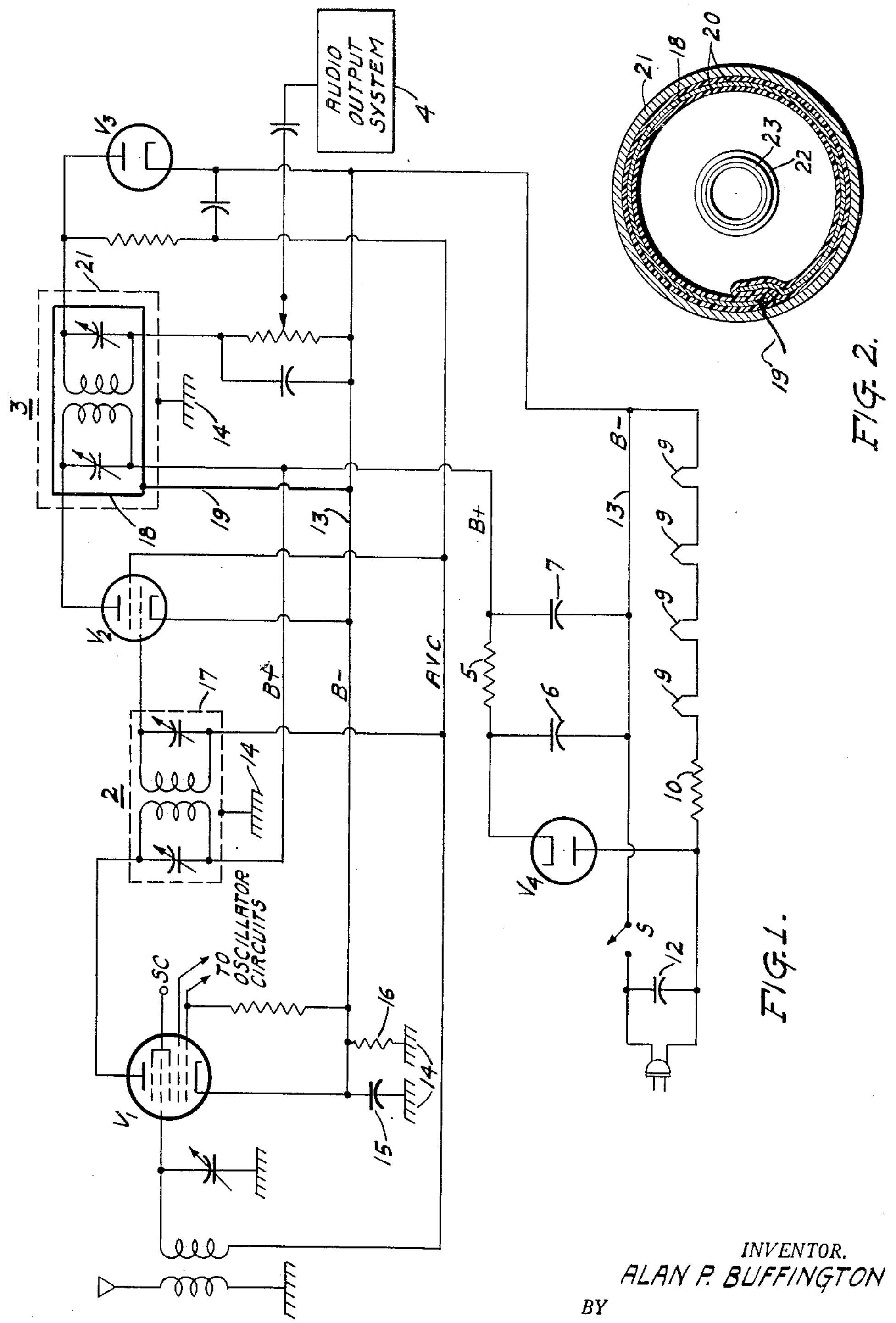

This invention relates to radio receivers which are adapted to derive their operating power from D.-C. mains, or from A.-C. mains, without the use of an interposed transformer. Included in this group are D.-C. receivers, A.-C./D.-C. receivers, voltage doubler A.-C. receivers, and the like. For convenience of reference, these receivers will be merely termed transformerless receivers throughout this specification.

The present invention relates particularly to improved means for reducing and controlling interstage feedback in transformerless receivers. The improvement is accomplished by a modification of the shielding means applied to the R.-F. and/or I.-F. coils or transformers.

In most radio receivers it is customary to mount the various receiver components upon a chassis made of good conductive material and to use the chassis as a common return for the R.-F. and I.-F. currents employed in the receiver. It is also customary to confine the electric and magnetic fields which surround an R.-F. or I.-F. coil to the immediate vicinity thereof by providing a coil shield made of conducting non-magnetic material, such as aluminum or copper. The shield is conventionally grounded to the receiver chassis so that radio frequency currents electrically induced in the material of the shield due to the action of electric fields thereon are returned by way of the chassis to the inducing circuit. Electrical energy magnetically induced in the shield material is dissipated directly therein.

In the usual A.-C. receiver which employs a line transformer, a center-tap on the secondary thereof is connected to the chassis, either directly or through a few hundred ohms; the cathodes of the detector and amplifier tubes are similarly returned to the chassis. The return to chassis of R.-F. currents electrostatically induced in the material of the coil shield is consequently a return to cathode, and hence a direct return to the inducing circuit.

In transformerless receivers the supply mains are connected directly and conductively to the vacuum tube circuits. One side of the line is connected directly to the cathode circuits and the other side is connected directly, or through the rectifier, to the anode circuits. In these receivers the chassis is not, and should not be, connected directly to either of the main line conductors. To make such a connection would be dangerous to life and property since the line plug in one of its two possible socket positions would apply full line voltage to the chassis.

The chassis in a transformerless receiver is nevertheless safely and conventionally employed as a common return for R.-F. and I.-F. currents by connecting the chassis to the common cathode conductor (B—) through an element or network which offers very high impedance to direct currents and to alternating currents of line frequencies (50-60 C. P. S.) but offers very low impedance to R.-F. and I.-F. currents. Through this low impedance R.-F. path flow the radio frequency currents which are electrically induced in the shield surrounding an R.-F. or I.-F. output coil by the action of the electric fields thereon. These current produce a voltage drop across the low R.-F. impedance which, though small, may appear directly in the grid-cathode circuit of an early-stage low-level tube, as for example, of the frequency-converter tube. As the voltage gain from the input of the frequency-converter tube to the final I.-F. transformer is probably very great, a very small R.-F. voltage between chassis and B— is sufficient to produce noticeable and objectionable feedback.

I have discovered that interstage feedback in a transformerless receiver may be substantially reduced by providing an electrostatic shield for the R.-F. or I.-F. output coil insulated from chassis and having a low-impedance connection from the shield directly to B—. In making this connection from the shield of the R.-F. or I.-F. output coil to the B— conductor, I create a condition in which there is strong possibility of full line voltage becoming impressed upon the shield since the line plug in one of its two possible socket positions places full line voltage upon the B— conductor. I avoid the establishment of a shock and fire hazard, however, by providing an insulating or protecting covering for the shield.

In a preferred form of my invention, I use a conventional R.-F. or I.-F. transformer including conventional can or container and I place an insulted, conductive, non-magnetic metallic foil electrostatic shield intermediate the coil windings and the container. The container is mounted upon and connected conductively to the chassis in the customary manner; and the container continues to serve as the magnetic shield of the coil. A low impedance connection is taken from the electrostatic shield to the common cathode conductor. I have found such an arrangement to be effective to reduce very substantially interstage feedback.

It is an object of this invention to provide means for reducing and controlling feedback in receivers which are adapted to derive their operating power directly from electric supply mains without the interposition of a line transformer.

It is a more specific object of this invention to provide improved means for reducing and controlling interstage feedback in the R.-F. and/or I.-F. amplifier stages of a transformerless receiver.

It is another object of this invention to provide improved shielding means for R.-F. and I.-F. coils and transformers.

It is a further object of this invention to provide improved electrostatic shielding means for R.-F. and I.-F. coils and transformers when used in transformerless receivers which will reduce interstage feedback while permitting continued employment of conventional R.-F. and I.-F. coils and containers.

It is a feature of this invention that radio frequency currents electrically induced in the material of an output coil shield through the action of the electric fields thereon are returned through a low impedance path to the inducing circuit and are prevented from flowing through chassis.

These and other objects, features, and advantages of the present invention will become clear from a consideration of the following description and accompanying drawings in which:

Figure 1 is an illustration, partly schematic, partly diagrammatic, of an A.-C./D.-C. superheterodyne receiver embodying one form of the invention; and Figure 2 is a schematic bottom view of an R.-F. or I.-F. transformer having a preferred form of improved shielding means; the can and shield are shown in cross-section.

Referring now to Figure 1, there is shown a transformerless receiver of the A.-C./D.-C. superheterodyne type comprising a first detector-oscillator or frequency converter $V_1$, a first tuned I.-F. transformer 2, an I.-F. amplifier tube $V_2$, a second tuned I.-F. transformer 3, a combined second detector and automatic-volume-control tube $V_3$, and an audio output system 4.

The power supply means shown comprises an alternating current rectifier $V_4$ and a filter system which includes series resistor 5 and shunt capacitors 6 and 7. It will be understood that when the power supply means is plugged into a D.-C. mains outlet, the rectifier $V_4$ does not function as a rectifier but merely becomes a resistive element in the D.-C. path. It is consequently necessary when power is obtained from D.-C. mains to plug into the mains in the position of correct polarity as otherwise the rectifier would constitute an open circuit to the flow of direct current.

The cathode heaters 9 of the various vacuum tubes employed may be serially connected across the mains including, if necessary, one or more ballast resistors 10. The mains voltage may also be impressed directly on the rectifier-filter combination as shown in the drawing or if desired, one or both sides of the combination may be connected to the mains through a ballast resistor. A small capacitor 12 may be connected across the mains to by-pass R.-F. currents.

It will be observed that in the transformerless receiver shown in Figure 1 there is a direct connection between the cathodes of tubes $V_1$, $V_2$ and $V_3$ and the common B— conductor 13 which, when switch S is closed, is directly connected to one side of the mains. If desired, the connection between these cathodes and the B— conductor 13 may include the usual cathode biasing resistors and the like; these elements are customarily of low impedance. The plate circuits of the tubes $V_1$ and $V_2$ may be returned to the other side of the mains by way of the filter resistor 5 and rectifier $V_4$.

The various receiver components are mounted on a metal chassis represented generally at 14. The chassis 14 may or may not be connected to earth but ordinarily is not so connected. In addition to serving as a supporting structure for the receiver components, the chassis 14 serves as an electrically conductive member having a common potential to which certain of the receiver circuits may be connected. However, since it is common practice to ground one side of the electric supply mains, the common cathode condutor 13 (B—) is not connected conductively to chassis 14 by way of a low resistance path for it would then be possible for the full mains voltage to exist between chassis 14 and ground. This would occur whenever the line plug was in one of its two possible socket positions.

The common B— lead 13 is, however, connected to chassis 14 through a path which offers low impedance to the various R.-F. and I.-F. currents employed in the receiver while at the same time offering high impedance to low freqency (50–60 C. P. S.) and direct line currents. Such a path is provided in Figure 1 by capacitor 15 and parallel resistor 16. The values of these elements, in a conventional transformerless receiver, may be of the order of 0.2 mf. and 120,000 ohms respectively.

Encompassing first I.-F. transformer 2 is a container-shield represented in Figure 1 by the dotted line 17. The container-shield 17 is mounted upon and connected conductively to chassis 14 in conventional manner as schematically indicated in the figure.

In accordance with my invention, I surround second I.-F. transformer 3 with a conductive metallic shield which is insulated from chassis and I provide a low impedance connection from the insulated shield to the B— conductor. Such a shield is represented in Figure 1 by the heavy solid line 18 which is shown conductively connected to B— conductor 13 by way of insulated conductor 19. If desired, the connection may be made through a capacitor, the requirement being that the connection offer low impedance to radio and intermediate frequency currents.

Shield 18 may take any one of several forms. If desired, it may serve both as an electrostatic and as a magnetic shield. It may, for example, be a rigid metallic container of aluminum, copper or other material of good conductivity, preferably non-magnetic, mounted upon but insulated from chassis 14 and having its exterior surface completely insulated, as for example with rubber, to prevent the existence of shock and fire hazard to persons and property.

Or shield 18 may be formed of plastic material having an interior, conductive, non-magnetic, metallic lining or coating which may, if desired, be applied by spraying.

I prefer, however, a form of shield illustrated in Figure 2. In that figure, shield 18 is a conductive, non-magnetic, metallic foil, as for example copper foil; it is insulated on both sides, as with paper or a synthetic rubber material 20. It serves only as an electrostatic shield. It is placed within the conventional R.-F. or I.-F. transformer container or can 21 between the coil windings 22, 23 and the container wall, preferably close to the latter. Insulated conductor 19 is firmly secured to metal foil 18, as by soldering to the inner surface. The shield 18 encompasses coil windings 22, 23 and its edges overlap as shown. The purpose of the overlapping insulated joint is to ensure complete electrostatic shielding, while preventing the metal foil 18 from acting as a short-circuited turn. Shield 18 thus serves as an effective electrostatic shield without any appreciable increase in eddy current losses. The Q of the transformer is accordingly not lower than that obtained with a conventional container-shield. Container or can 21 provides the necessary magnetic shielding.

The preferred arrangement shown in Figure 2 has the following advantages: a conventional can is employed; the can is mounted upon and connected conductively to the chassis in standard manner; the can continues to serve its usual function of supporting the coil form and of providing mechanical protection for the coils; and the can continues to act as a magnetic shield.

Can 21 is also shown in Figure 1 but it is to be understood that in some embodiments of my invention, can 21 may be entirely eliminated, as for example, where shield 18 is a completely insulated rigid metallic container having a connection only to B—. In such case, the shield serves both as an electric and magnetic shield, as well as a supporting means and mechanical protection for the coil. I have not indicated preference for this form for the reason that a non-conventional coil can is required. In the preferred form, a standard, readily procurable transformer is employed and it is merely necessary to insert the electrostatic shield therewithin when the transformer is to be used in a transformerless receiver.

It will be seen that in accordance with my invention, radio frequency currents electrostatically induced in the material of output coil shield 18 are returned to common cathode conductor 13 (B—) through low impedance connection 18, and are prevented from flowing through chassis 14 by reason of insulation 20. These currents therefore no longer flow through the low impedance R.-F. path 15—16 connecting chassis 14 to B— conductor 13. Consequently, the R.-F. voltages heretofore developed across this path and which have heretofore caused objectionable feedback are eliminated.

Any feedback which may have heretofore existed in transformerless receivers as a result of the capacitive coupling between the input coil of I.-F. transformer 2 and its chassis-connected container-shield 17 is likewise eliminated by the removal of the above mentioned electrostatically induced R.-F. currents from chassis.

In Figure 1, I have illustrated my invention by an application to a single I.-F. output stage but it is to be understood that in a receiver comprising more than one stage of I.-F. amplification, the improved shielding means may be and preferably is applied to all stages. Similar shielding means may also be applied to the R.-F. stages of amplification where the receiver circuit includes one or more R.-F. stages.

In the claims appended hereto, the term "radio frequency" or "radio frequencies" is to be understood to include the intermediate frequencies used in the receiver as well as the higher frequencies.

Having described my invention by means of an illustrative embodiment but intending to be limited only by the claims, I claim:

1. In a radio receiver, a plurality of vacuum tubes having at least anode, cathode, and control electrodes, a conductor common to the cathode circuits of said tubes, a conductor common to the anode circuits of said tubes, means including said conductors for energizing said circuits conductively from electric supply mains, an electrically conductive chassis, the impedance between said chassis and said common cathode conductor being sufficiently high at supply-mains frequency to prevent a flow of current of shock-hazard magnitude therebetween, and a radio frequency coil connected in the anode circuit of one of said tubes, the improvement which comprises the provision of a metallic electrostatic shield surrounding said coil, means insulating said shield from said chassis, and a low impedance connection directly from said shield to said common cathode conductor.

2. In a radio receiver comprising a conductive chassis, a plurality of vacuum tube circuits including anode and cathode circuits, means for energizing said vacuum tube circuits from electric supply mains including a conductive connection between said supply mains and said vacuum tube circuits, a conductor common to the cathode circuits, the impedance between said common cathode conductor and said chassis being sufficiently high at supply-mains frequency to prevent a flow of current of shock-hazard magnitude therebetween, and a radio-frequency coil, the improvement which comprises the provision of: a conductive non-magnetic shield encompassing said coil; a low impedance connection at radio and intermediate frequencies directly from said shield to said common cathode conductor; and means for insulating said shield from said chassis.

3. In a radio receiver comprising a conductive chassis, a plurality of vacuum tube circuits including anode and cathode circuits, a conductor common to the cathode circuits, the impedance between said common cathode conductor and said chassis at supply-mains frequency being sufficiently high to prevent a flow of current of shock-hazard magnitude therebetween, a radio-frequency output coil, and means for energizing said vacuum tube circuits from electric supply mains, said energizing means including a conductive connection between said mains and said vacuum tube circuits, the improvement which comprises the provision of: means for magnetically shielding said coil; means for connecting said magnetic shielding means directly to said chassis, said connecting means having low impedance at radio and intermediate frequencies; means for electrostatically shielding said coil; means for insulating said electrostatic shielding means from said chassis and from said magnetic shielding means; and means having low impedance at radio and intermediate frequencies directly connecting said electrostatic shielding means to said common cathode conductor.

4. In a radio receiver comprising a conductive chassis, a plurality of vacuum tube circuits including anode and cathode circuits, a conductor common to the cathode circuits, means interconnecting said common cathode conductor and said chassis, said interconnecting means offering low impedance to currents of radio and intermediate frequencies and relatively high impedance to direct currents and currents of supply-mains frequency, means for energizing said vacuum tube circuits from electric supply mains including a conductive connection between said mains and said vacuum tube circuits, and a radio-frequency interstage transformer having a plurality of windings and a conductive metallic housing mounted upon and connected conductively to said chassis, the improvement which comprises the provision of: an insulated conductive metallic electrostatic shield between said windings and said housing; and a low impedance connection at radio and intermediate frequencies directly from said shield to said common cathode conductor.

ALAN P. BUFFINGTON.

REFERENCES CITED

The following references are of record in the file of this patent:

UNITED STATES PATENTS

| Number | Name | Date |
|---|---|---|
| 1,933,261 | Harris | Oct. 31, 1933 |
| 1,965,202 | Roys | July 3, 1934 |
| 2,176,064 | Cole et al. | Oct. 17, 1939 |
| 2,180,413 | Harvey | Nov. 21, 1939 |
| 2,201,730 | Hull | May 21, 1940 |
| 2,281,488 | Freeland | Apr. 28, 1942 |
| 2,313,379 | Wood | Mar. 9, 1943 |
| 2,319,744 | Mougey | May 18, 1943 |
| 2,362,034 | Stahl | Nov. 7, 1944 |
| 2,388,848 | Howe | Nov. 13, 1945 |

FOREIGN PATENTS

| Number | Country | Date |
|---|---|---|
| 29,386 | Netherlands | Mar. 16, 1933 |